United States Patent
Lee

(10) Patent No.: US 10,369,695 B2
(45) Date of Patent: Aug. 6, 2019

(54) DEVICE FOR PLANNING PATH OF MOBILE ROBOT AND METHOD FOR PLANNING PATH OF MOBILE ROBOT

(71) Applicant: HANWHA DEFENSE CO., LTD., Changwon-si, Gyeongsangnam-do (KR)

(72) Inventor: Jin Han Lee, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 106 days.

(21) Appl. No.: 15/308,404

(22) PCT Filed: Apr. 28, 2015

(86) PCT No.: PCT/KR2015/004255
§ 371 (c)(1),
(2) Date: Nov. 2, 2016

(87) PCT Pub. No.: WO2015/167220
PCT Pub. Date: Nov. 5, 2015

(65) Prior Publication Data
US 2017/0057087 A1 Mar. 2, 2017

(30) Foreign Application Priority Data
May 2, 2014 (KR) .......................... 10-2014-0053398

(51) Int. Cl.
*G05D 1/02* (2006.01)
*B25J 9/16* (2006.01)
(Continued)

(52) U.S. Cl.
CPC ........... *B25J 9/1666* (2013.01); *B25J 9/1664* (2013.01); *G01C 21/3446* (2013.01);
(Continued)

(58) Field of Classification Search
None
See application file for complete search history.

(56) References Cited

U.S. PATENT DOCUMENTS 7,079,943 B2 * 7/2006 Flann ................... A01B 69/008
172/4.5
7,272,492 B2 * 9/2007 McCubbin ............. G01C 21/00
701/23
(Continued)

FOREIGN PATENT DOCUMENTS

KR  10-2009-0126414 A  12/2009
KR  10-2011-0048330 A   5/2011
(Continued)

OTHER PUBLICATIONS

International Search Report, issued by International Searching Authority in corresponding International Application No. PCT/KR2015/004255, dated Aug. 19, 2015, (PCT/ISA/210).

*Primary Examiner* — Thomas G Black
*Assistant Examiner* — Demetra R Smith-Stewart
(74) *Attorney, Agent, or Firm* — Sughrue Mion, PLLC

(57) ABSTRACT

Disclosed are a device for planning a path of a mobile robot and a method for planning a path of a mobile robot. The device for planning a path of a mobile robot and the method for planning a path of a mobile robot, according to the present invention, extend a route planning tree by sampling grid-based nodes between a start point and a target point of the mobile robot. Therefore, the present invention can configure a path plan of the mobile robot to be a path optimized within a quick time.

15 Claims, 5 Drawing Sheets

(51) Int. Cl.
*B25J 9/06* (2006.01)
*G05B 19/04* (2006.01)
*G01C 21/34* (2006.01)

(52) U.S. Cl.
CPC ....... *G01C 21/3453* (2013.01); *G05D 1/0214* (2013.01); *G05D 1/0217* (2013.01); *G05D 1/0274* (2013.01); *G05B 2219/40428* (2013.01); *Y10S 901/01* (2013.01)

(56) References Cited

U.S. PATENT DOCUMENTS

| | | | | |
|---|---|---|---|---|
| 8,483,874 | B2* | 7/2013 | Kim | B25J 9/1664 341/79 |
| 9,102,062 | B2* | 8/2015 | Lee | B25J 9/1666 |
| 2011/0035050 | A1* | 2/2011 | Kim | B25J 9/1666 700/246 |
| 2011/0035051 | A1* | 2/2011 | Kim | B25J 9/1666 700/246 |
| 2011/0035087 | A1* | 2/2011 | Kim | B25J 9/1666 701/25 |
| 2011/0093191 | A1* | 4/2011 | Trovato | G06Q 10/047 701/533 |
| 2011/0106306 | A1* | 5/2011 | Kim | B25J 9/1664 700/246 |
| 2011/0106307 | A1* | 5/2011 | Kim | B25J 9/1666 700/246 |
| 2012/0010772 | A1* | 1/2012 | Pack | B25J 9/1664 701/27 |
| 2014/0121833 | A1* | 5/2014 | Lee | B25J 9/1666 700/255 |

FOREIGN PATENT DOCUMENTS

| | | |
|---|---|---|
| KR | 10-2012-0069949 A | 6/2012 |
| KR | 10-1179075 B1 | 9/2012 |
| KR | 10-2012-0112507 A | 12/2012 |
| KR | 10-2013-0112507 A | 10/2013 |
| KR | 10-1339480 B1 | 12/2013 |

* cited by examiner

DEVICE FOR PLANNING PATH OF MOBILE ROBOT AND METHOD FOR PLANNING PATH OF MOBILE ROBOT

TECHNICAL FIELD

The present invention relates to a path planning apparatus and method of a mobile robot. More particularly, the present invention relates to a path planning apparatus and method of a mobile robot for setting the movement of the mobile robot to goal point as an optimized path while setting the path planning of the mobile robot in real time.

BACKGROUND ART

A robot is referred to as an automatic doll which is made by assembling mechanical devices into a human-shaped doll to make its hand, feet and other parts act like humans. However, recently, an automatic apparatus autonomously performing any task has been collectively referred to as a robot regardless of a human figure.

Mobile robots have attracted considerable attention because they can perform a work instead of a person under extreme conditions or hazardous areas. Further, various kinds of mobile robots helping household works while autonomously moving around the house, such as cleaning robots, have widely spread.

In order for a mobile robot to perform a task while autonomously moving, recognition of surrounding environment is essential. The recognition of a robot to surrounding environment is conducted through a map. As a typical example of the map, there is a grid map in which surrounding space is expressed as grids having the same size and the presence or absence of an object is displayed in each of the grids. A robot creates a grid map for surrounding environment using a distance measuring sensor.

As the method of allowing a robot to create a grip map, there is a method in which a robot acquires distance information while rotating 360° in place and creates a grip map using the acquired distance information.

That is, a grid-based path planning method of setting a path for moving a mobile robot to goal point using the information confirmed from the grid map created as above is suitable for forming an optimized path of a mobile robot from starting point to goal point, but is problematic in that it takes much time to complete the setting of a path, and in that it is impossible to set a path planning for moving a mobile robot in real time under wide-area environment when considering the kinematic characteristics of the mobile robot.

Further, a sampling-based path planning method of finding a moving path to final goal point while expanding a tree by repeating the procedures of selecting the node nearest from the starting point of a mobile robot can set a path for moving the mobile robot in real time, but is problematic in that the ratio of an optimized path of moving the mobile robot to goal point is lowered, and in that there is a possibility of the path setting itself for moving the mobile robot to the goal point being failed due to inefficient sampling when considering the kinematic characteristics of the mobile robot.

DISCLOSURE

Technical Problem

Accordingly, the present invention has been made to solve the above-mentioned problems occurring in the related art, and an object of the present invention is to provide a path planning apparatus and method of a mobile robot for setting the movement of the mobile robot to goal point as an optimized path while setting the path planning of the mobile robot in real time.

Additional advantages, subjects, and features of the invention will be set forth in part in the description which follows and in part will become apparent to those having ordinary skill in the art upon examination of the following or may be learned from practice of the invention.

Technical Solution

A path planning apparatus of a mobile robot to achieve present invention's said goal, comprising: a recognition unit recognizing an obstacle located between starting point and goal point of the mobile robot to set grid-based nodes; and a path planning creation unit sampling the grid-based nodes to expand a path planning tree for movement control of the mobile robot.

According to an exemplary embodiment, the path planning creation unit performs the sampling of the grid-based nodes by randomly extracting any node from the grid-based nodes.

According to an exemplary embodiment, the path planning creation unit expands the path planning tree until the sampled node is a node corresponding to the goal point.

According to an exemplary embodiment, wherein the path planning creation unit performs the expansion of the path planning tree using a rapidly-exploring random tree (RRT) algorithm.

According to an exemplary embodiment, the path planning creation unit compares a first path function including a function of a distance from the sampled node to the goal point and a direction vector with a second path function including a function of a distance from current position of the mobile robot to the goal point and a direction vector.

According to an exemplary embodiment, as the result of comparison of the first path function with the second path function, the path planning creation unit does not add the sampled node to the expansion of the path planning tree when the value of the first path function is more than the value of the second path function, and adds the sampled node to the expansion of the path planning tree when the value of the first path function is less than the value of the second path function.

According to an exemplary embodiment, the recognition unit sets via-points, which are inflection points on a grid map-based path defined between the starting point and the goal point, as the grid-based nodes.

According to an exemplary embodiment, the recognition unit sets the grid-based nodes in consideration of kinematic characteristics of the mobile robot.

According to an exemplary embodiment, the kinematic characteristics of the mobile robot include at least one of information about size of the mobile robot, information about movable direction of the mobile robot, and information about movable range of the mobile robot.

According to an exemplary embodiment, the path planning creation unit performs the sampling of the grid-based nodes without considering the kinematic characteristics of the mobile robot.

A path planning method of a mobile robot to achieve present invention's said goal, comprising: setting starting point and goal point in movement area of a mobile robot on the basis of a grip map; recognizing an obstacle located between the starting point and goal point of the mobile robot to set grid-based nodes; and sampling the grid-based nodes to expand a path planning tree for movement control of the mobile robot.

According to an exemplary embodiment, in the setting the grid-based nodes, the grid-based nodes are set as via-points, which are inflection points on the grid map-based path defined between the starting point and the goal point.

According to an exemplary embodiment, in the setting the grid-based nodes, the grid-based nodes are set in consideration of kinematic characteristics of the mobile robot.

According to an exemplary embodiment, the kinematic characteristics of the mobile robot include at least one of information about size of the mobile robot, information about movable direction of the mobile robot, and information about movable range of the mobile robot.

According to an exemplary embodiment, in the expanding the path planning tree, the grid-based nodes are sampled without considering the kinematic characteristics of the mobile robot.

According to an exemplary embodiment, in the expanding the path planning tree, the sampling of the grid-based nodes is performed by randomly extracting any node from the grid-based nodes.

According to an exemplary embodiment, the expanding the path planning tree is repeated until the sampled node is a node corresponding to the goal point.

According to an exemplary embodiment, the expanding the path planning tree is performed using a rapidly-exploring random tree (RRT) algorithm.

According to an exemplary embodiment, in the expanding the path planning tree, a first path function including a function of a distance from the sampled node to the goal point and a direction vector is compared with a second path function including a function of a distance from current position of the mobile robot to the goal point and a direction vector, the sampled node is not added to the expansion of the path planning tree when the value of the first path function is more than the value of the second path function, and the sampled node is added to the expansion of the path planning tree when the value of the first path function is less than the value of the second path function.

Advantageous Effects

According to the present invention, there is an advantage in that a sampling-based path planning is created in real time on the basis of grid-based nodes set in consideration of the kinematic characteristics of a mobile robot, thereby setting the movement of a mobile robot to goal point as an optimized path while setting the path planning of the mobile robot in real time.

The effects of the present invention are not limited to the above-described effects, and other unmentioned effects will be clearly understood to those skilled in the art from the description of claims.

DESCRIPTION OF DRAWINGS

The above and other subjects, features and advantages of the present invention will be more apparent from the following detailed description taken in conjunction with the accompanying drawings, in which.

BEST MODE FOR INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art.

The same reference numbers indicate the same components throughout the specification. "and/or" includes each mentioned item and combination of one and more items.

Although the first, the second and so on are utilized to express a variety of elements, components and/or sections, these elements, components and/or sections are not limited to these terms. These terms are used to distinguish one element, component, or section from other element, component, or section. Therefore, the first element, the first component or the first section mentioned below might be the second element, the second component or the second section in the present invention's technical idea.

The terms used in this specification are for explaining the embodiments, not to limit present invention. In this specification, the singular form includes the plural form without particular reference. "comprises" and/or "comprising" used in this specification do not exclude one and more other components, steps, actions and/or elements besides mentioned components, steps, actions and/or elements.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Figure 1:
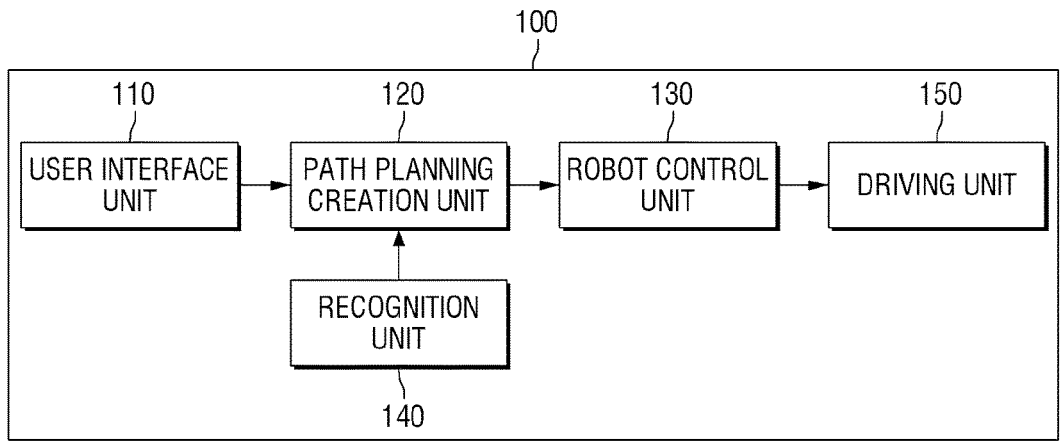
FIG. 1 is a block diagram illustrating a path planning apparatus of a mobile robot according to an embodiment of the present invention.

FIG. 1 is a block diagram illustrating a path planning apparatus of a mobile robot according to an embodiment of the present invention.

Referring to FIG. 1, a path planning apparatus 100 of a mobile robot may be configured such that a sampling-based path planning is created in real time on the basis of grid-based nodes set in consideration of the kinematic characteristics of a mobile robot, thereby setting the movement of a mobile robot to goal point as an optimized path while setting the path planning of the mobile robot in real time.

Specifically, the path planning apparatus 100 of a mobile robot may include a recognition unit 140 recognizing an obstacle located between the starting point and goal point of a mobile robot to set grid-based nodes, and a path planning creation unit 120 randomly extracting any node from the grid-based nodes provided from the recognition unit 140 and adding the extracted node to sampling-based nodes to expand a path planning tree for movement control of the mobile robot.

Here, the "grid-based node setting" means to set a plurality of nodes expressing a path most suitable for moving a mobile robot to goal point on a grid map in which the movement area of the mobile robot is divided into cells having a predetermined area.

Figure 2:
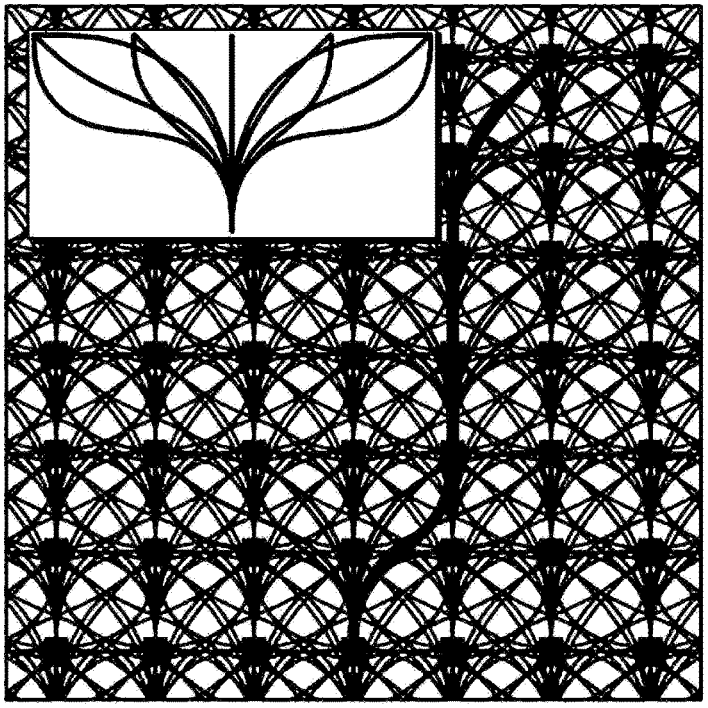
FIG. 2 is an exemplary view illustrating an example of a grid-based path planning method.

Moreover, it is preferable that grid-based nodes, as shown in FIG. 2, are set in consideration of kinematic characteristics of a mobile robot. The kinematic characteristics of the mobile robot may include information about movable direction, range, and the like of the mobile robot, and may further include information about the size and the like of the mobile robot.

Figure 3:
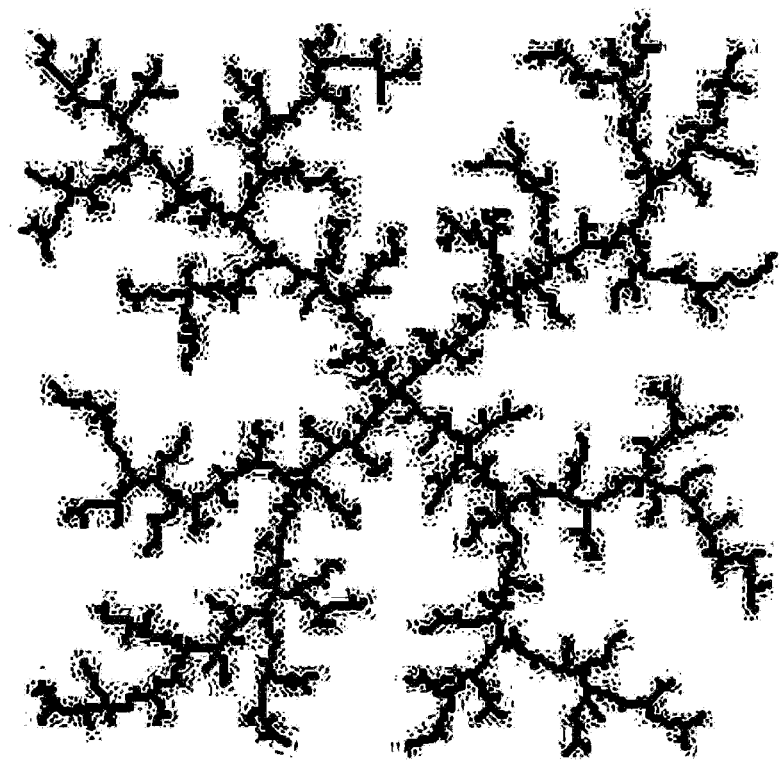
FIG. 3 is an exemplary view illustrating an example of a sampling-based path planning method.

Further, the "sampling-based node setting" means to gradually expand a path planning tree while sampling any node from the starting point of a mobile robot and repeatedly selecting the sampled node. FIG. 3 is an exemplary view illustrating an example of a sampling-based path planning method, where the kinematic characteristics of a mobile robot are not considered.

In the path planning apparatus of a mobile robot according to an embodiment of the present invention, the selection range for sampling any node in the sampling-based node setting is limited to grid-based nodes set in consideration of kinematic characteristics of the mobile robot.

That is, since the grid-based nodes, which are set by expanding a path planning tree based on sampling in consideration of kinematic characteristics of the mobile robot, are limited to subjects to be selected for sampling, it is possible to form an optimized path in real time even when a method not considering the kinematic characteristics of the mobile robot is adopted.

Further, the path planning apparatus 100 of a mobile robot may further include a user interface unit 110, a robot control unit 130 and a driving unit 150 in addition to the recognition unit 140 and the path planning creation unit 120, so as to be provided in a form including the entire configuration for movement of the mobile robot to goal point.

The user interface unit 110 is provided to allow a user to input a work command for moving the position of the mobile robot through switch operation, touch input, voice, or the like.

The robot control unit 130 controls the driving unit 150 depending on the path planning received from the path planning creation unit 120, so as to control the position movement of the mobile robot to goal point.

The path planning creation unit 120 repeatedly perform the procedure of expanding a path planning tree until the node extracted (sampled) from the grid-based nodes is a node corresponding to the goal point.

That is, when the path planning creation unit 120 determines that the node extracted (sampled) from the grid-based nodes corresponds to the goal point, the path finding for movement of the mobile robot to the goal point is completed, and thus it is not necessary for expanding a path planning tree in order to find an additional path.

The path planning creation unit 120 may perform the expansion of a path planning tree using a rapidly-exploring random tree (RRT) algorithm planning a path connecting the starting point and the goal point while satisfying constraint conditions, such as avoidance of collision with an obstacle in the movement area of the mobile robot.

Further, the path planning creation unit 120 may compare a first path function including a function of a distance from the node extracted (sampled) from the grid-based nodes to the goal point and a direction vector with a second path function including a function of a distance from current position of the mobile robot to the goal point and a direction vector.

In this case, when the path planning creation unit 120 determines that the value of the first path function is more than the value of the second path function as the results of comparison of the first path function with the second path function, it does not add the node extracted (sampled) from the grid-based nodes to the expansion of the path planning tree.

In contrast, when the path planning creation unit 120 determines that the value of the first path function is less than the value of the second path function as the results of comparison of the first path function with the second path function, it adds the node extracted (sampled) from the grid-based nodes to the expansion of the path planning tree.

Figure 4:
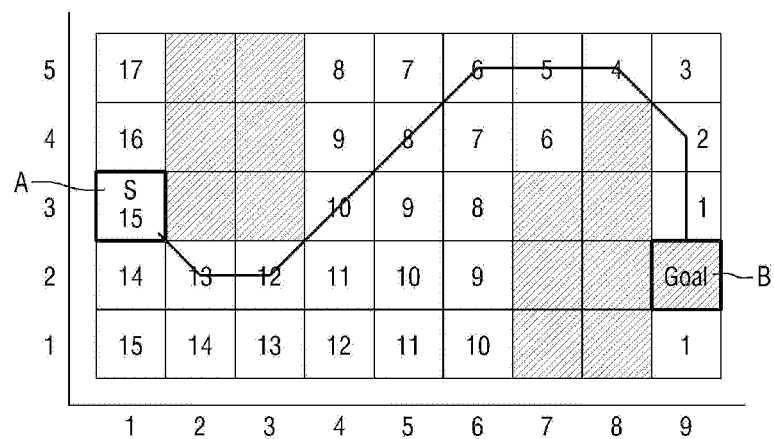
FIG. 4 is an exemplary view illustrating an example of a grid-based path setting depending on a path planning method of a mobile object according to an embodiment of the present invention.

FIG. 4 is an exemplary view illustrating an example of a grid-based path setting depending on a path planning method of a mobile object according to an embodiment of the present invention.

Referring to FIG. 4, starting point A and goal point B may be set in the movement area of the mobile robot.

FIG. 4 shows the results of creating map information in the movement area of the mobile robot based on previously input information and creating a path based on this map information. The map of FIG. 4 is composed of total 45 cells of rows and columns of 9×5. Each of the cells shows the result of calculation of cumulative distance to goal point or a relative value to the cumulative distance in the movement of the mobile robot. In an embodiment, the cumulative distance or the relative value is a weighted value for finding the shortest distance for the movement of the mobile robot from each of the cells to the goal point. Hereinafter, coordinates of each of the cells will be used to refer to a specific cell. Since starting point has a horizontal coordinate of '1' and a vertical coordinate of '3', it is referred to as "cell (1, 3)".

In the movement area, a portion, on which the relative value is not shown, is a portion recognized as an obstacle.

As shown in FIG. 4, starting point A and goal point B are set in the movement area of the mobile robot, and then a path may be defined based on the grid map.

Figure 5:
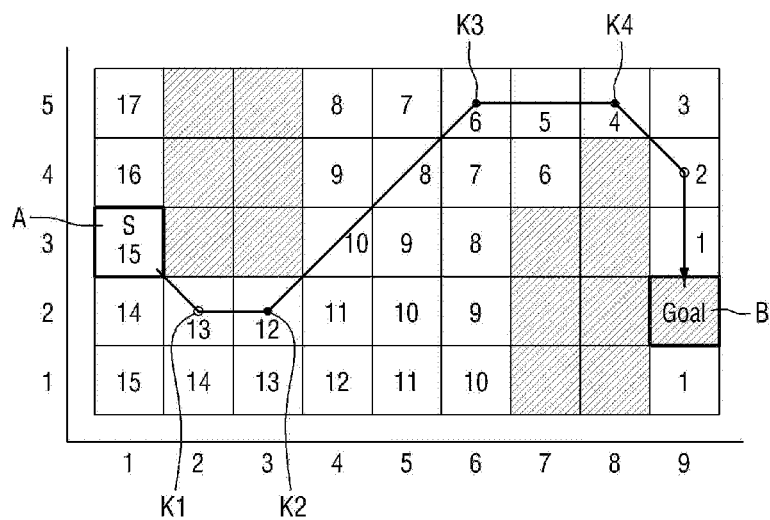
FIG. 5 is an exemplary view illustrating the specified grid-based nodes located on the path of FIG. 4.

FIG. 5 is an exemplary view illustrating the specified grid-based nodes located on the path of FIG. 4.

Referring to FIG. 5, when the grid-based path is defined as shown in FIG. 4, via points, which are inflection points related to the movement of the mobile robot on the path of FIG. 4, may be specified as the grid-based nodes K1 to K4.

Figure 6:
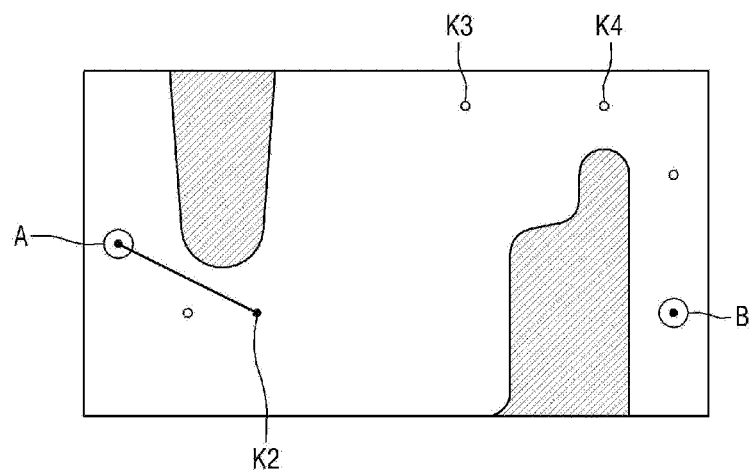
FIG. 6 is an exemplary view illustrating an example of a first sampling-based path planning procedure according to the path planning method of FIG. 4.

FIG. 6 is an exemplary view illustrating an example of a first sampling-based path planning procedure according to the hybrid path planning method of FIG. 4.

Referring to FIG. 6, the path planning creation unit 120 creates a sampling-based path planning in real time based on the grid-based nodes set in consideration of kinematic characteristics of the mobile robot.

For example, the path planning creation unit 120, as described above, perform a sampling procedure in which the grid-based node are specified, and then any node is randomly extracted from the specified grid-based nodes.

In FIG. 6, the randomly extracted node is 'K2'. Thus, the path planning creation unit 120 creates a path for the movement of the mobile robot from the starting point to the node 'K2' in real time. Thereafter, robot control and driving are carried out, and thus the mobile robot moves to the node 'K2'.

Figure 7:
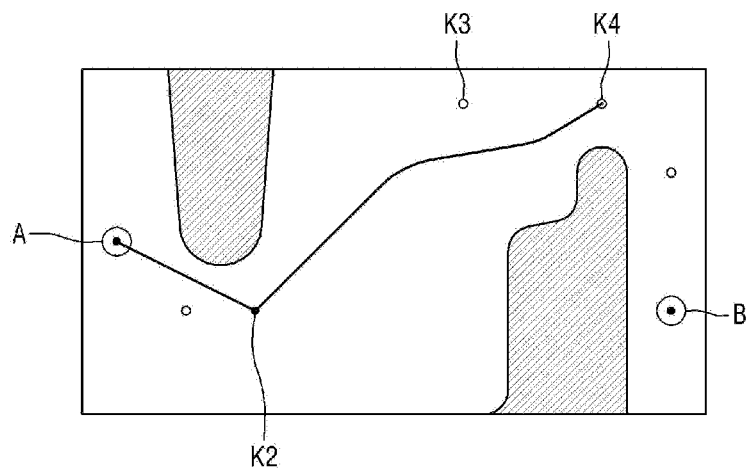
FIG. 7 is an exemplary view illustrating a second path planning procedure which is a subsequent path planning procedure of FIG. 6.

FIG. 7 is an exemplary view illustrating a second path planning procedure which is a subsequent path planning procedure of FIG. 6.

The path planning creation unit 120 additionally carries out the procedure of selecting any node from the specified grid-based nodes. In this case, the additionally selected node, as shown in FIG. 7, may be 'K4'. Thus, the path planning creation unit 120 creates a path for the movement of the mobile robot from the starting point to the node 'K4' in real time. Thereafter, robot control and driving are carried out, and thus the mobile robot moves to the node 'K4'.

If the node extracted in the procedure of extracting any node from the specified grid-based nodes is 'K1', the path planning creation unit 120 may compare a first path function including a function of a distance from 'K1' to the goal point and a direction vector with a second path function including a function of a distance from current position (that is, point K2) of the mobile robot to the goal point and a direction vector.

As the result of comparison, since it is determined that the value of the first path function is more than the value of the second path function, the node 'K1' is excluded without being added to the expansion of a path planning tree. Thus, the path planning creation unit 120 further carries out the procedure of selecting any node from the grid-based nodes, so as to repeat a process for expanding a path planning tree.

Figure 8:
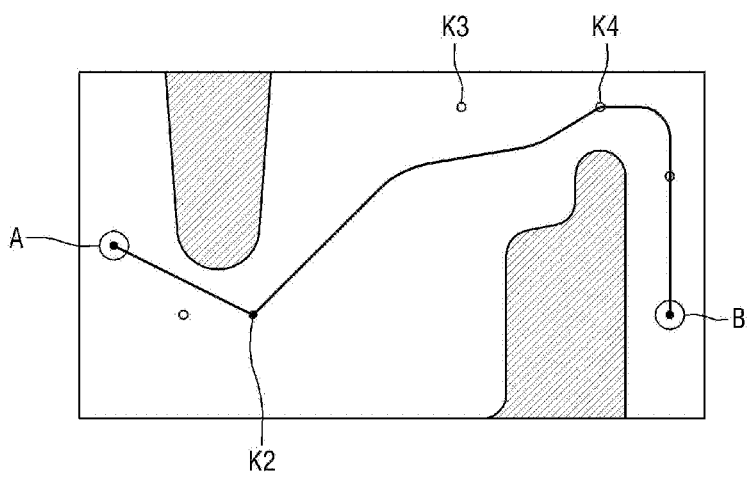
FIG. 8 is an exemplary view illustrating a third path planning procedure which is a subsequent path planning procedure of FIG. 7.

FIG. 8 is an exemplary view illustrating a third path planning procedure which is a subsequent path planning procedure of FIG. 7.

Referring to FIG. 8, when the node selected in the procedure of selecting any node from the specified grid-based nodes corresponds to the goal point, the path planning creation unit 120 adds the extracted node to the sampling-based nodes to expand a path planning tree, and then sets the end of path formation.

Figure 9:
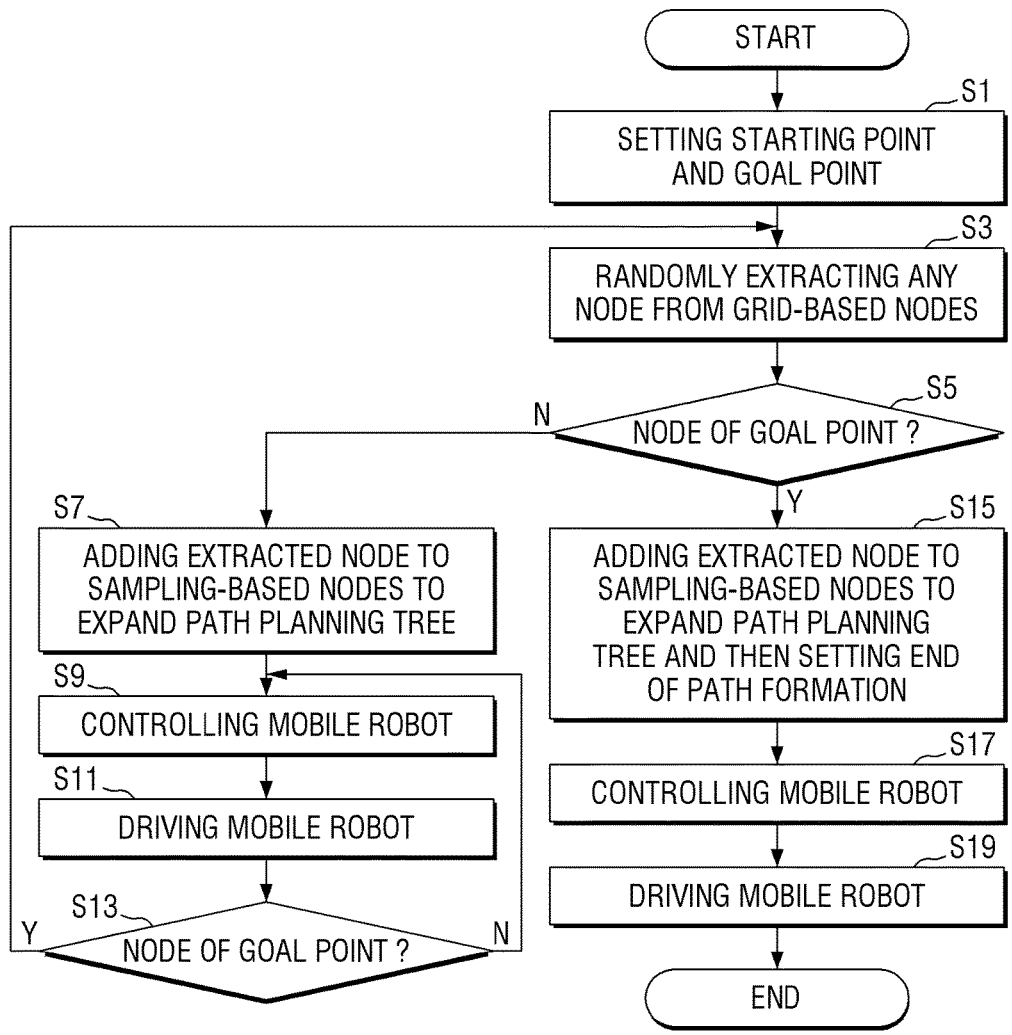
FIG. 9 is a flowchart illustrating an example of a path planning method of a mobile robot using the path planning apparatus shown in FIG. 1.

FIG. 9 is a flowchart illustrating an example of a path planning method of a mobile robot using the path planning apparatus shown in FIG. 1.

Referring to FIG. 9, in the path planning method of a mobile robot, starting point and goal point are set in the movement area of a mobile robot (S1).

Then, the path planning apparatus 100 sets a path between the starting point and the goal point on the movement area of the mobile robot using the previously stored grid-based map information, and specifies the grid-based nodes located on the set grid-based path.

Then, any node is randomly extracted from the specified grid-based nodes (S3).

It is determined whether the node extracted in step S3 is a node corresponding to the goal point (S5).

When the node extracted according to the determination result of step S5 does not correspond to the goal point, the extracted node is added to the sampling-based nodes to expand a path planning tree (S7).

In step S7, a first path function including a function of a distance from the extracted node to the goal point and a direction vector is compared with a second path function including a function of a distance from current position of the mobile robot to the goal point and a direction vector. In this case, when the value of the first path function is more than the value of the second path function, the extracted node is not added to the expansion of a path planning tree. In contrast, when the value of the first path function is less than the value of the second path function, the extracted node is added to the path planning nodes to expand the path planning tree.

Then, the path planning creation unit 120 transfers information about the expanded path planning tree to the robot control unit 130, and the robot control unit 130 controls the driving unit 150 using the information about the expanded path planning tree, so as to move the mobile robot (S9 and S11).

Then, when the position of the mobile robot reaches the extracted node in step S3, the path planning creation unit 120 performs the step of randomly extracting any node from the grid-based nodes again (S13).

If the node extracted according to the determination result of step S5 corresponds to the goal point, the extracted node is added to the sampling-based nodes to expand a path planning tree, and then sets the end of path formation.

Then, the path planning creation unit 120 transfers information about the path planning tree expanded in step S15 to the robot control unit 130, and the robot control unit 130 controls the driving unit 150 using the information about the expanded path planning tree, so as to move the mobile robot to the goal point (S17 and S19).

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

INDUSTRAIL APPLICABILITY

Since the present invention is used in setting the movement of a mobile robot to goal point as an optimized path while setting the path planning of the mobile robot in real time, the present invention can be clearly carried out as well as has sufficient commercial availability. Therefore, the present invention has industrial applicability.

The invention claimed is:

1. A path planning apparatus of a mobile robot, comprising:
    a recognition unit recognizing an obstacle located between starting point and goal point of the mobile robot and setting grid-based nodes based on the recognized obstacle and kinematic characteristics of the mobile robot; and
    a path planning creation unit sampling the grid-based nodes to expand a path planning tree for movement control of the mobile robot,
    wherein the path planning creation unit performs the sampling of the grid-based nodes without considering the kinematic characteristics of the mobile robot.

2. The path planning apparatus of a mobile robot of claim 1,
    wherein the path planning creation unit performs the sampling of the grid-based nodes by randomly extracting any node from the grid-based nodes.

3. The path planning apparatus of a mobile robot of claim 1,
wherein the path planning creation unit expands the path planning tree until the sampled node is a node corresponding to the goal point.

4. The path planning apparatus of a mobile robot of claim 1,
wherein the path planning creation unit performs the expansion of the path planning tree using a rapidly-exploring random tree (RRT) algorithm.

5. The path planning apparatus of a mobile robot of claim 1,
wherein the recognition unit sets via-points, which are inflection points on a grid map-based path defined between the starting point and the goal point, as the grid-based nodes.

6. The path planning apparatus of a mobile robot of claim 1,
wherein the kinematic characteristics of the mobile robot include at least one of information about size of the mobile robot, information about movable direction of the mobile robot, and information about movable range of the mobile robot.

7. A path planning apparatus of a mobile robot, comprising:
a recognition unit recognizing an obstacle located between a starting point and a goal point of the mobile robot and setting grid-based nodes based on the recognized obstacle and kinematic characteristics of the mobile robot; and
a path planning creation unit sampling the grid-based nodes to expand a path planning tree for movement control of the mobile robot,
wherein the path planning creation unit compares a first path function including a function of a distance from the sampled node to the goal point and a direction vector with a second path function including a function of a distance from current position of the mobile robot to the goal point and a direction vector.

8. The path planning apparatus of a mobile robot of claim 7,
wherein, as a result of comparison of the first path function with the second path function, the path planning creation unit does not add the sampled node to the expansion of the path planning tree when a value of the first path function is more than a value of the second path function, and adds the sampled node to the expansion of the path planning tree when the value of the first path function is less than the value of the second path function.

9. A path planning method of a mobile robot, comprising:
setting starting point and goal point in movement area of a mobile robot on a basis of a grip map;
recognizing an obstacle located between the starting point and goal point of the mobile robot and setting grid-based nodes based on the recognized obstacle and kinematic characteristics of the mobile robot; and
sampling the grid-based nodes to expand a path planning tree for movement control of the mobile robot,
wherein, in the expanding the path planning tree, the grid-based nodes are sampled without considering the kinematic characteristics of the mobile robot.

10. The path planning method of a mobile robot of claim 9,
wherein, in the setting the grid-based nodes, the grid-based nodes are set as via-points, which are inflection points on a grid map-based path defined between the starting point and the goal point.

11. The path planning method of a mobile robot of claim 9,
wherein the kinematic characteristics of the mobile robot include at least one of information about size of the mobile robot, information about movable direction of the mobile robot, and information about movable range of the mobile robot.

12. The path planning method of a mobile robot of claim 9,
wherein, in the expanding the path planning tree, the sampling of the grid-based nodes is performed by randomly extracting any node from the grid-based nodes.

13. The path planning method of a mobile robot of claim 9,
wherein the expanding the path planning tree is repeated until the sampled node is a node corresponding to the goal point.

14. The path planning method of a mobile robot of claim 9,
wherein the expanding the path planning tree is performed using a rapidly-exploring random tree (RRT) algorithm.

15. The path planning method of a mobile robot of claim 9,
wherein, in the expanding the path planning tree,
a first path function including a function of a distance from the sampled node to the goal point and a direction vector is compared with a second path function including a function of a distance from current position of the mobile robot to the goal point and a direction vector,
the sampled node is not added to the expansion of the path planning tree when a value of the first path function is more than a value of the second path function, and
the sampled node is added to the expansion of the path planning tree when the value of the first path function is less than the value of the second path function.

* * * * *